UNITED STATES PATENT OFFICE.

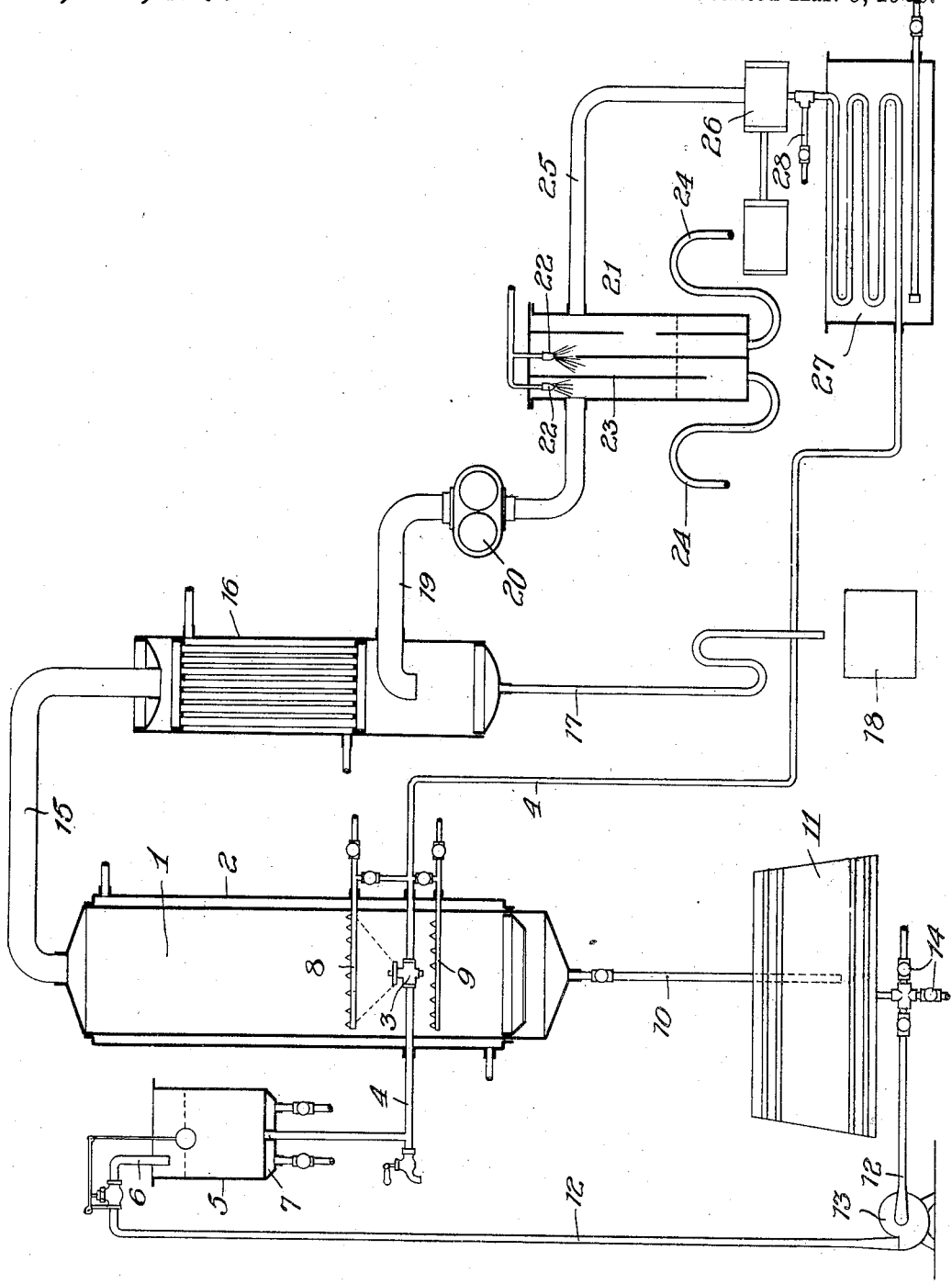

GEORGE B. SIPPEL AND GERHARDT J. PATITZ, OF CHICAGO, ILLINOIS, ASSIGNORS TO PETER SCHOENHOFEN BREWING COMPANY, OF CHICAGO, ILLINOIS, A CORPORATION OF ILLINOIS.

ART OF DEALCOHOLIZING FERMENTED BEVERAGES.

1,333,457.  Specification of Letters Patent.  Patented Mar. 9, 1920.

Application filed February 8, 1918. Serial No. 216,073.

*To all whom it may concern:*

Be it known that we, GEORGE B. SIPPEL and GERHARDT J. PATITZ, citizens of the United States, residing at Chicago, in the county of Cook and State of Illinois, have invented a new and useful Improvement in the Art of Dealcoholizing Fermented Beverages, of which the following is a specification.

Our invention relates to the art of dealcoholizing fermented beverages for the production of non-alcoholic or low alcoholic products. It is the object of our invention to provide a method and means by which this de-alcoholization may be accomplished at a minimum expense and at a minimum depreciation of the product. The invention will be fully understood from the following specification taken in connection with the accompanying drawing, which represents diagrammatically a vertical section through the more important parts of an apparatus constructed in accordance with the invention.

Referring more particularly to these drawings—

The numeral 1 designates a de-alcoholizing chamber which, as shown, is in the form of a vertical cylindrical tank having a jacket 2 through which steam or hot water may be circulated to maintain the walls of the chamber at a proper temperature. Near the base of the de-alcoholizing chamber 1 there is mounted an upwardly-directed spray-nozzle, or atomizing nozzle 3, to which the fermented beverage to be de-alcoholized is supplied by a pipe 4, this supply being preferably under a constant static head maintained by an elevated feed-tank 5 equipped with a float-controlled feed line 6. The bottom of the tank may be jacketed, as shown at 7, so that the liquid in the tank may be maintained at any fixed temperature, as will later appear. The atomizing and mixing nozzle 3 is further supplied with gas under pressure by a pipe 4', from which taps are taken to supply additional gas inlets in the form of ring nozzles 8 and 9 mounted, respectively, above and below the atomizing nozzle. With respect to the atomizing nozzle it should be noted that its construction is preferably such as to give a conical sheet or film approximating the form shown by the dotted lines in the drawing. The bottom of the chamber 1 is conical in form and is equiped with a drain-pipe 10 which leads to a storage-receptacle 11, the normal liquid level of which should be above the outlet end of the drain-pipe 10 to constitute a liquid seal for the latter. From the storage receptacle 11 a pump line 12 leads to the feed tank 5, a centrifugal pump 13 being shown as connected in this line. The usual feed and drain connections 14 will also be provided for the storage receptacle.

From the upper end of the de-alcoholizing chamber a vapor outlet pipe 15 leads to and discharges into the top of a tubular condenser 16, the tubes of which may be cooled by water, brine, or other refrigerant. The condensate collecting in the base of the condenser 16 is drained off by a pipe 17 having a liquid trap, as shown, discharging into an alcohol collection reservoir 18, from which it may be taken to rectifying stills or otherwise treated.

The gases and uncondensed vapors reaching the base of the condenser 16 are withdrawn by a suction conduit 19, which leads to the inlet side of a rotary blower 20. The outlet side of this blower discharges into a scrubber, or purifier, 21, which, as shown, operates both upon the spray and submerged blast principle, the scrubbing fluid being introduced by nozzles 22 and collecting in the base of the scrubber above the level of the baffles 23 therein, to force the gases to pass through and be washed by the liquid body. Constant level overflow pipes 24 maintain the desired liquid level within the scrubber.

From the scrubber the gases are led through a conduit 25 to the inlet side of a compressor diagrammatically illustrated at 26, thence to a heater or cooler, or combined heater and cooler, diagrammatically illustrated at 27. A tap 28 on the line beyond the compressor serves as a means for introducing additional quantities of gas, or for venting the system of the gas contained therein. From the heater 27 the compressed gas line designated 4, leads to the atomizing nozzle 3 and ring-nozzles 8 and 9, as heretofore stated. The operation of the apparatus as employed for the de-alcoholization of a standard beer is as follows: The charge or batch of beer to be treated is introduced into the storage receptacle 11 and carbonic acid gas is supplied to the system as through the tap 28, circulated for a sufficient length of time to displace the air from the system, further quantities of gas being added and impure gas withdrawn as may be required for this purpose. Steam or water is supplied to the jacket 2 of the de-alcoholizing chamber, and to the jacket 7 of the feed tank, while brine or other refrigerant is circulated around the tubes of the condenser 16. The scrubber nozzles 22 are supplied with a concentrated calcium chlorid solution, and the heater 27 is supplied with hot water, or with water heated to a proper temperature by the injection of live steam. The temperatures maintained in the various parts of the apparatus should be as follows: The beer in the feed tank about 90° F., the inner walls of the de-alcoholizing chamber about 100° F., the compressed gas in the heater 27 should have a temperature of about 135° F. and a pressure of 35 to 40 pounds per square inch. The condenser 16 should be maintained at the lowest temperature possible. Under these conditions the various pumps are placed in operation, with the result that the beer under the constant static head of the feed tank 5 is fed to the nozzle 3, where it mixes with and is atomized by the compressed and heated stream of carbon dioxid gas. The conical sheet, film or spray produced by this nozzle meets the ascending currents of heated carbon dioxid gas issuing from the ring-nozzles 8 and 9, with the result that a large proportion of the alcohol, together with more or less of the water of the beverage is volatilized. Such volatilization is accompanied by a reduction in temperature of the entire gas and liquid body, this effect being further aided by the expansion of the compressed gas in the mixing or atomizing nozzle and in the ring nozzles. This chilling effect is, to a certain degree, advantageous, since it prevents the beer from reaching the full temperature of the heated compressed gas stream, which might result in injuring the delicate albuminous substances of the beer. We have found, however, that unless means is provided for preventing this chilling tendency from going beyond a certain limit, it is impossible to effect economical de-alcoholization. With this in mind we have provided the de-alcoholizing chamber with the heated jacket 2, by which means the temperature of the vapors and gas within the chamber is maintained at approximately 100° F., or slightly below this point. A certain proportion of the heat absorbed in the volatilization of the liquid by the expansion of the gases is therefore supplied by the walls of the de-alcoholizing chamber itself, and it is therefore possible to secure the maximum volatilization and to prevent any re-condensation of the vaporized alcohol without heating either the beer itself, the gas, or the de-alcoholizing chamber to any temperature which could effect an injury to the product. This feature of our invention we regard as of the greatest importance. Thus, were it attempted to supply all of the heat required for the process of heating the beer itself, the gas alone, or the de-alcoholizing chamber alone, the temperature required to effect the transfer of heat at the necessary temperature would be so high that injury to the product would result. By our invention, however, heat is supplied to all three in such a manner as to effect the maximum volatilization, but without any possibility of injury to the product through overheating.

We find, in fact, that under the conditions described the heat supplied is so forced as to maintain the beer itself at an approximately constant temperature of 90 to 100° F. throughout the operation; that is, both the incoming beer from the feed tank 5 and the outgoing de-alcoholized or partially de-alcoholized beer flowing from the drain-pipe 10 are approximately this same temperature. In addition, the gas and vapor within the de-alcoholizing chamber remains at a temperature only slightly below that of the walls of the chamber, or at approximately 90 to 95° F.

A current of carbon dioxid gas at a temperature slightly below 100° F. and saturated with water and alcohol vapors is drawn off through the conduit 15 and into the condenser 16, where it is chilled to the lowest practicable temperature, with the resultant condensation of the major portion of the water and alcohol. The suction conduit 19, by which a slight vacuum of one inch or more of mercury is maintained in the de-alcoholizing chamber and condenser, leads off the chilled and practically dry gas current and discharges it into the scrubber 21, in which the last traces of water, together with any other impurities capable of being washed out, are removed by the action of the spray from the nozzles 22, and to the liquid body in the base of the scrubber. The chilled purified gas is raised to a pressure of 40 pounds per square inch in the compressor 26, after leaving which it may be again chilled if desired, or may pass directly to the heater 27, as shown, to be raised to the required temperature of 135° F.

The batch or charge of beer originally introduced into the receptacle, or cask, 11, will be continuously re-circulated through the de-alcoholizing chamber as described, until its alcohol contents is reduced to the predetermined figure, for example 45/100 of one per cent. It may then be discharged from the cask 11 and replaced by a fresh batch without interrupting the process. It is therefore possible to operate continuously.

The entire apparatus constituting a closed circulating system as it does, it is possible to operate without substantial loss of carbon dioxid. This is advantageous from two aspects: first, from the standpoint of economy alone, and second, from the view point of protection to the product. Thus it is well known that beer is exceedingly sensitive to contamination, forming a breeding ground for organisms of all descriptions. It is therefore important to avoid bringing in contact with the beer any substance which might contain such organisms. By the continued recirculation of the same mass of carbon dioxid gas, the chance of introducing contaminating matter into the beer is correspondingly decreased, it being necessary only to insure the purification of the very small additional quantities of gas which must be added from time to time to make up for leakage or other losses.

While we have referred in the foregoing to carbonic acid or carbon dioxid gas as constituting the medium for vaporization and carrying off of the vapors, it will be understood that our invention is not limited to this specific gas. We have found by experimenting, that air or other oxygen containing gas is apt to produce partial oxidation of the beer and injure the final product. But it is quite possible to use nitrogen, purified combustion gases, or other inert gases in place of carbon dioxid without any danger of such injury. Our invention therefore contemplates the employment not only of carbon dioxid, but of any other non-oxidizing gas which will not re-act chemically with the beer, or impart a disagreeable odor or flavor thereto.

While we have described in considerable detail the exact manner of carrying out our improved process in a particular form of apparatus, it will be understood that this is by way of illustration only, and for the purpose of making our invention more clear, and that we do not regard the invention as limited to the details set forth, except in so far as such limitations are included within the terms of the accompanying claims, in which it is our intention to claim all novelty inherent in our invention as broadly as is permissible in view of the prior art.

What we claim as new, and desire to secure by Letters Patent, is:

1. The method of de-alcoholizing fermented beverages which consists in mixing said beverages in heated condition with a heated gas current and introducing the mixture in finely divided form into a de-alcoholizing chamber, and simultaneously introducing into the said chamber a further quantity of heated inert gas in streams intersecting the streams of finely divided liquid while maintaining the finely divided liquid at a temperature approaching 100° F.

2. The method of de-alcoholizing fermented beverages which consists in atomizing said beverages by the use of a heated current of inert gas, subjecting the atomized beverage to the action of an additional current of heated inert gas, and simultaneously supplying heat from an extraneous source to the mixture of gas and finely divided liquid.

3. The method of de-alcoholizing beer which consists in heating the said beer to a temperature of approximately 100° F., admixing the heated beer with a current of carbon dioxid under a substantial pressure and at a temperature of approximately 135° F. within a mixing nozzle, subjecting the fluid issuing from the said nozzle to the action of a further quantity of carbon dioxid at a temperature of approximately 135° F. and simultaneously applying heat from an extraneous source to maintain the temperature of the liquid and gas at approximately 100° F.

4. A de-alcoholizing apparatus comprising a de-alcoholizing chamber, a mixing nozzle within said chamber for introducing thereinto liquid and gas, means for collecting liquid within the chamber and re-circulating the same back to the said nozzle, means for collecting the gas passing from the said chamber, means for chilling the said gas, means for re-heating the said gas, and means for re-introducing the heated gas into the said nozzle.

GEORGE B. SIPPEL.
GERHARDT J. PATITZ.